Sept. 25, 1928.  
E. J. ZELENKA  
1,685,347  
BEARING FOR CENTRIFUGAL EXTRACTORS  
Filed Jan. 13, 1927
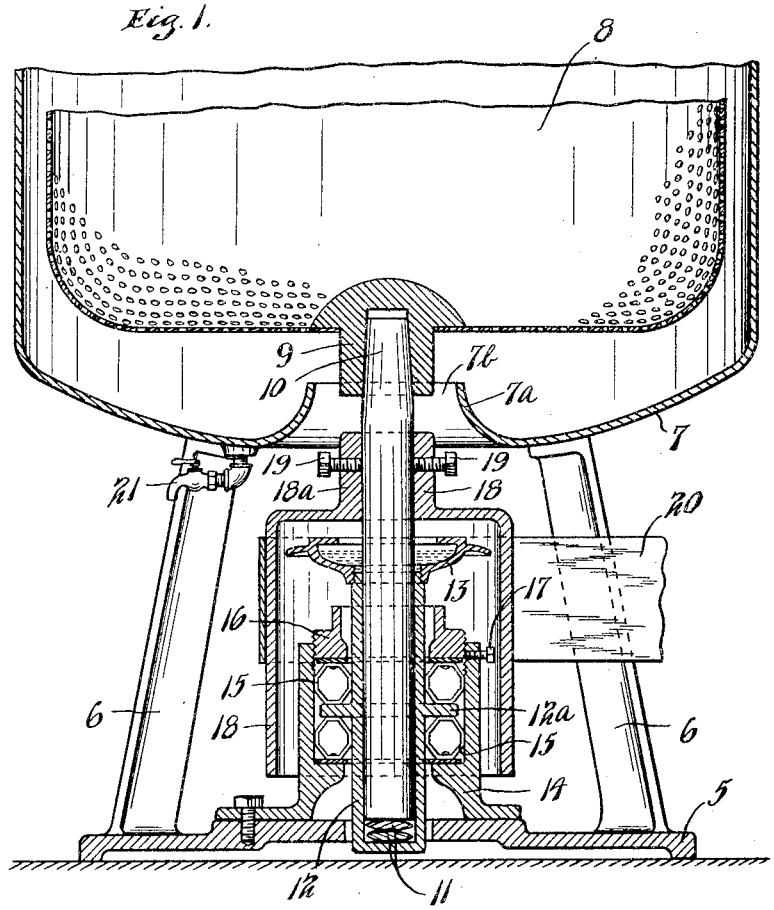
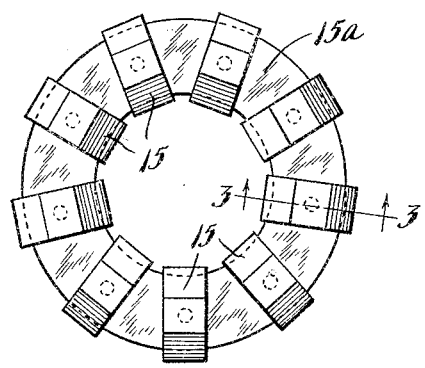
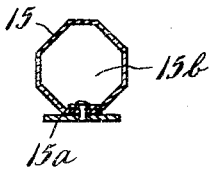
INVENTOR.  
EDWARD J. ZELENKA.  
BY HIS ATTORNEYS.

Patented Sept. 25, 1928.

1,685,347

UNITED STATES PATENT OFFICE.

EDWARD J. ZELENKA, OF MINNEAPOLIS, MINNESOTA.

BEARING FOR CENTRIFUGAL EXTRACTORS.

Application filed January 13, 1927. Serial No. 160,855.

This invention relates to a device for holding a rotating shaft in desired position. While the invention is capable of many applications, in the embodiment of the invention illustrated it is particularly adapted for use in a centrifugal machine. Such machines comprise a receptacle for containing various materials and adapted to be rotated at high speed. The receptacle is carried and supported on a vertical shaft which shaft is arranged for some slight movement as the receptacle is rotated. When the rotation is first started, the receptacle, due to eccentric loading and other reasons, tends to gyrate through a short distance. After the receptacle and shaft attain a certain speed, they assume a definite position and rotate about a definite axis. It is desirable to have a mounting for the shaft, therefore, and a controling mechanism therefor which will permit this gyratory movement and tend to hold the shaft in a definite position.

It is an object of this invention, therefore, to provide a controlling means for a rotating shaft adapted to permit slight movements of the shaft and yet which is resilient and tends to hold the shaft in a definite position.

It is a further object of the invention to provide a controlling means for a shaft comprising a bearing in which the shaft is journaled, which bearing is engaged by a plurality of resilient means permitting sidewise movement thereof and of the shaft, but which tends to hold the shaft in a definite position.

It is more specifically an object of the invention to provide a controlling means for a rotating shaft comprising a bearing having a flange extending thereabout, said bearing and flange being engaged by a plurality of hollow members formed from a resilient strip, a casing enclosing said bearing and also being engaged by said hollow members.

These and other objects and advantages of the invention will be fully set forth in the following description made in connection with the accompanying drawings, in which like reference characters refer to similar parts throughout the several views and in which:—

Fig. 1 is a view in vertical section through a portion of a centrifugal machine embodying the present invention;

Fig. 2 is a plan view of one of the controlling means used; and

Fig. 3 is a vertical section taken on line 3—3 of Fig. 2.

Referring to the drawings, a machine is shown comprising a base member 5 having rising therefrom the legs 6. While the base member and legs may be variously formed, in the embodiment of the invention illustrated they are shown as being integral parts of a casting. The legs 6 support and are secured at their upper ends to a receptacle 7 having an imperforate wall. The receptacle 7 has an upstanding cylindrical or frusto-conical flange 7ª at the central portion of its bottom which surrounds the opening 7ᵇ. A perforated container 8 is disposed within the receptacle 7 and concentric therewith, having a central hub 9 at its bottom provided with a socket adapted to receive the upper end of a shaft 10. The shaft 10 extends downward through the opening 7ᵇ and is supported at its lower end on step bearing washers 11 carried in the bottom of a cylindrical bearing 12 in which said shaft is journaled. The bearing or sleeve 12 is threaded at its upper end to receive an oil cap and cup member 13 adapted to carry a certain amount of lubricant and having an outstanding circumferential flange thereon. The member 12 has, intermediate its ends, an outwardly projecting cylindrical flange 12ª and said flange and a large portion of said member 12 are enclosed by a casing 14 supported upon and bolted to the base 5. The casing 14 has a cylindrical recess therein and supporting and controlling members 15 for the member 12 and shaft 10 are disposed about said member and shaft in said recess at each side of the flange 12ª. The upper end of the casing 14 is interiorly threaded and receives a threaded plug 16 apertured to have the member 12 pass therethrough. It will also be noted that the lower end of the member 12 which is closed and supports the washers 11, extends through an aperture in the base 5. While the members 15 may be variously made, in the embodiment of the invention illustrated they are similar in construction and each comprises an annular plate 15ª having secured thereto and extending radially thereof, a plurality of hollow or substantially ring shaped members 15ᵇ each formed as a closed figure and made from a strip of resilient metal. While the figures formed by the members 15ᵇ may be of various shapes, in the embodiment of the invention illustrated they are shown as polygonal or specifically of octagonal shape. The members 15 are placed in the recess in the casing 14 with the plate 15ª at the bottom of said recess and engaging the bottom of the plug 16 respectively. The plug 16 is screwed into the casing 14 so that the members 15ᵇ engage with one of their sides against the flange 12ª, another of their sides against the side of the member 12 and another side against the side of the casing 14. The members 15ᵇ can be flexed or distorted somewhat, owing to their resiliency. The plug 16 may be held in adjusted position by a set screw 17. A pulley 18 has its hub 18ª secured by the set screws 19 to the shaft 10 adjacent the receptacle 7 and the flange of the said pulley extends down over the members 12, 13 and 14 and is adapted to receive a driving belt 20. The receptacle 7 is equipped with a drain opening and the fluid contained in said receptacle may be drained in any desired manner as by the faucet 21.

In operation the materials to be treated, such as wet materials to be dried, will be placed in the container 8. The container 8 will be then rotated through the pulley 18 and belt 20. The receptacle 8 and shaft 10 are driven at high speed and as the machine is coming up to speed in its rotation, the shaft 10 has a gyratory movement. After the machine attains full speed and rotates at this speed for some time, the shaft 10 and container 8 then assume a certain definite position and rotate about a definite axis. The yielding controlling members 15 are provided to accommodate the gyratory movement of the shaft 10 and also to assist the same in assuming its definite position. As the shaft is gyrating, the member 12 also partakes of this movement and bears against the members 15ᵇ. These members as stated are yielding and can be distorted somewhat to accommodate the movements of the sleeve 12. The sleeve is thus supported on said members and said members tend to cause the sleeve to assume a position about a definite axis. At the same time, the members 15 tend to hold the member 12 in a definite position. It will be understood that the plug 16 can be adjusted as desired to cause the members 15ᵇ to properly engage the member 12 and the walls of the recess in member 14. The shaft 12 is lubricated by the oil or lubricant placed in the member 13.

From the above description it is seen that applicant has provided a very simple and efficient controlling member for a rotating shaft. The parts of the device are few in number and easily made and assembled. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A shaft controlling device having in combination, a rotating shaft, a sleeve in which said shaft is carried having a circumferential flange between its ends, a casing in which said sleeve is disposed, a plurality of polygonal resilient members formed respectively from strips of resilient metal disposed about said sleeve in radial planes above and below said flange and between said sleeve and the walls of said casing, said members below said flange being supported by said casing, and means threaded into the top of said casing about said sleeve adapted to engage said members above said flange, said members being resilient and flexible whereby they may be flexed to be brought into contact with said sleeve, flange and the wall of said casing, as well as with the bottom of said casing and said last mentioned member.

2. A shaft controlling device having in combination, a rotating shaft, a member having a cylindrical bore in which said shaft is journaled, and having a flange extending thereabout, a cylindrical casing surrounding said member and flange, a plurality of spaced hollow resilient members formed as closed figures arranged with their central planes disposed substantially radially of said shaft and member and about said member above and below said flange, respectively, and between said member and the wall of said casing, said casing having a bottom supporting said resilient members below said flange, and a vertically adjustable member in the top of said casing adapted to engage the tops of said resilient members disposed above said flange and exert pressure on all of said resilient members to flex the same so that they will engage said first mentioned member, the wall of said casing, and said flange, as well as engaging the bottom of said casing and said adjustable member.

In testimony whereof I affix my signature.

EDWARD J. ZELENKA.